United States Patent [19]
Levati

[11] 4,026,203
[45] May 31, 1977

[54] MACHINE FOR PEELING TOMATOES UNDER VACUUM

[76] Inventor: Renzo Levati, Via Nazionale No. 2, Collecchio (Parma), Italy

[22] Filed: Nov. 11, 1974

[21] Appl. No.: 522,644

[30] Foreign Application Priority Data

Oct. 9, 1974 Italy .................................. 46866/74

[52] U.S. Cl. .................................... 99/472; 99/584
[51] Int. Cl.[2] ...................... A23B 1/00; A23N 7/00; A47J 17/00
[58] Field of Search ............ 99/584, 467, 469, 472, 99/567, 540, 537, 483, 485; 426/479, 481, 482

[56] References Cited

UNITED STATES PATENTS

| | | | |
|---|---|---|---|
| 849,463 | 4/1907 | Crosby | 99/540 X |
| 1,923,712 | 8/1933 | Deitz | 99/472 X |
| 1,957,883 | 5/1934 | Grayson | 99/472 X |
| 2,839,112 | 6/1958 | Buck | 99/584 |
| 3,769,439 | 10/1973 | Kafejiev et al. | 99/472 X |

Primary Examiner—Harvey C. Hornsby
Assistant Examiner—Robert Pous
Attorney, Agent, or Firm—Brisebois & Kruger

[57] ABSTRACT

Machine for peeling tomatoes comprising a series of trays placed on a conveyor, and a series of covers arranged to seal said trays; each cover is connected to a tank under vacuum.

7 Claims, 6 Drawing Figures

MACHINE FOR PEELING TOMATOES UNDER VACUUM

SUMMARY OF THE INVENTION

Processes are known for peeling tomatoes intended for subsequent canning as "skinless tomatoes", which comprise subjecting the tomato to vacuum for a certain time after it has been "scalded". This causes the fruit to expand sufficiently to make the unexpandable skin break, so greatly facilitating its subsequent removal. Said processes according to the known art comprise scalding the tomato by maintaining it in boiling water for a time generally between 5 and 15 seconds.

The scalding in boiling water, carried out by known methods, is followed by the action of a vacuum of the order of 400 mm. Hg. absolute pressure, which is prolonged for at least 40 seconds.

This results in very long processing times, and the consequent slow rate of operation of the machines used for this purpose. Known machines which carry out this operation generally consist of a drum subjected to vacuum and connected to the outside by way of rotating valves of the sealed compartment type, through which the tomato is introduced into and withdrawn from the drum. A series of rotating radial walls inside the drum drives the tomato. A more rapid process in which the peeling time is greatly reduced would therefore be very welcome, but an obstacle exists to the accomplishment of such a process in peeling machines as presently conceived.

This is due to the fact that in these machines the tomato is driven by the radial mobile walls in the drum, and the fruit would be seriously damaged if these walls moved with excessive speed.

The object of the present invention is to provide an improved process and machine which eliminate the aforementioned disadvantages. With regard to the process, it has been surprisingly discovered that if the degree of vacuum created in the trays is increased to a comparatively large extent, i.e. by creating a higher suction of the order of 50–150 mm. Hg. absolute pressure, an improved peeling can be obtained in a time of not greater than 5 seconds. The accomplishment of a process of the aforementioned type which substantially comprises scalding the tomatoes for a very short time, of the order of 5–15 seconds, followed by suddenly placing the fruit under vacuum and then rapidly oscillating the pressure, has made it necessary to create a peeling machine which safeguards the wholeness of the tomato at the high production speeds required.

The machine according to the invention differs from known machines used for this purpose by the fact that in it, the scalded tomatoes are placed in individual trays into which they are inserted by falling and from which they leave again by falling, without ever coming into contact with pushing means which could damage them or compromise their wholeness. Furthermore the small number of tomatoes contained in each individual tray prevents the tomatoes pressing on each other, which could damage their wholeness.

Finally, the machine according to the present invention comprises static seal members without any mutual rubbing of parts, so increasing the life of these latter.

Further operational and constructional merits and characteristics of the invention will be more evident from the detailed description given hereinafter, with reference to the figures of the accompanying drawings, of two preferred embodiments of the invention given by way of non-limiting example.

Figure 1:
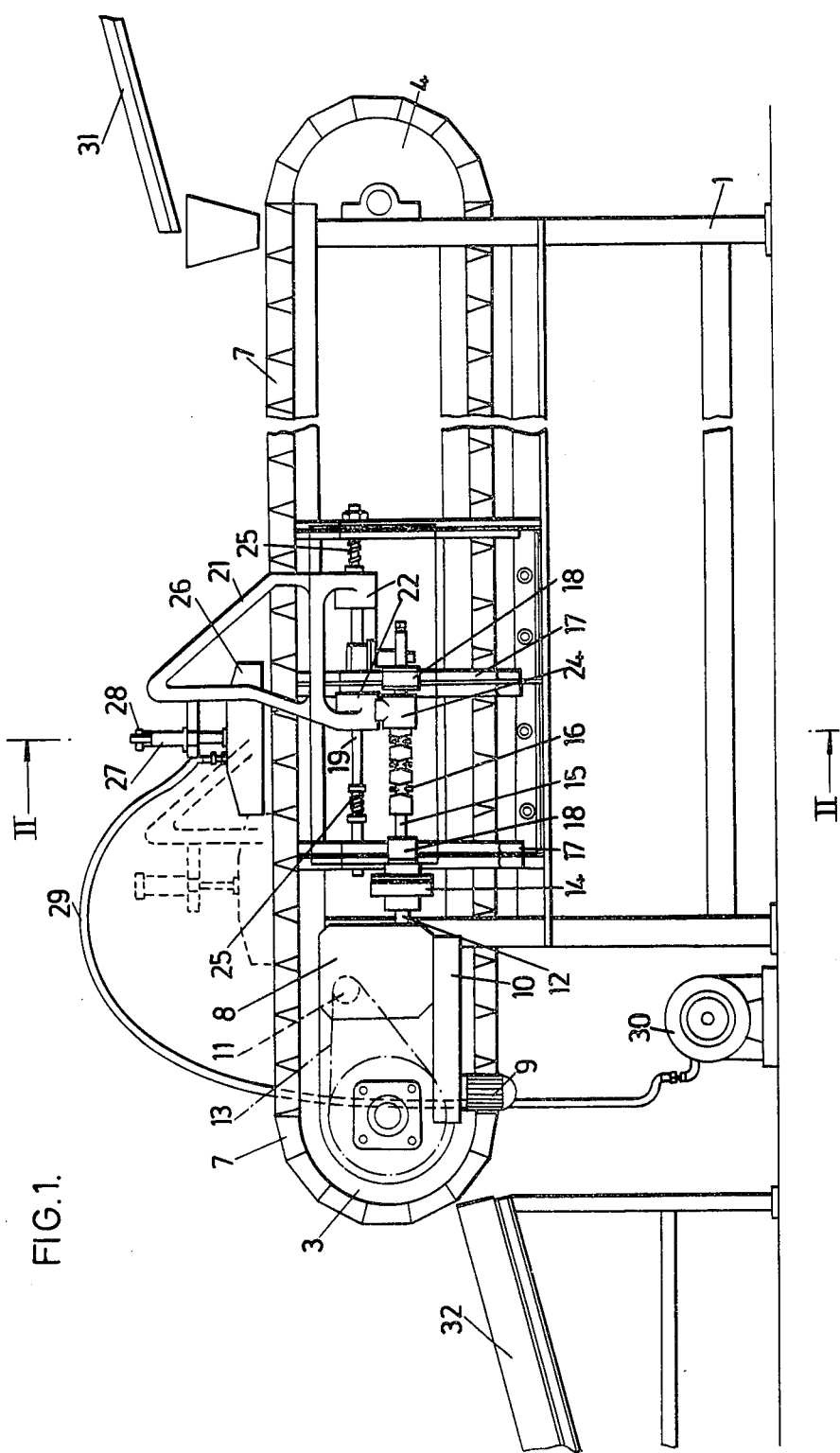
FIG. 1 is a side view of a first embodiment of the machine.
Figure 2:
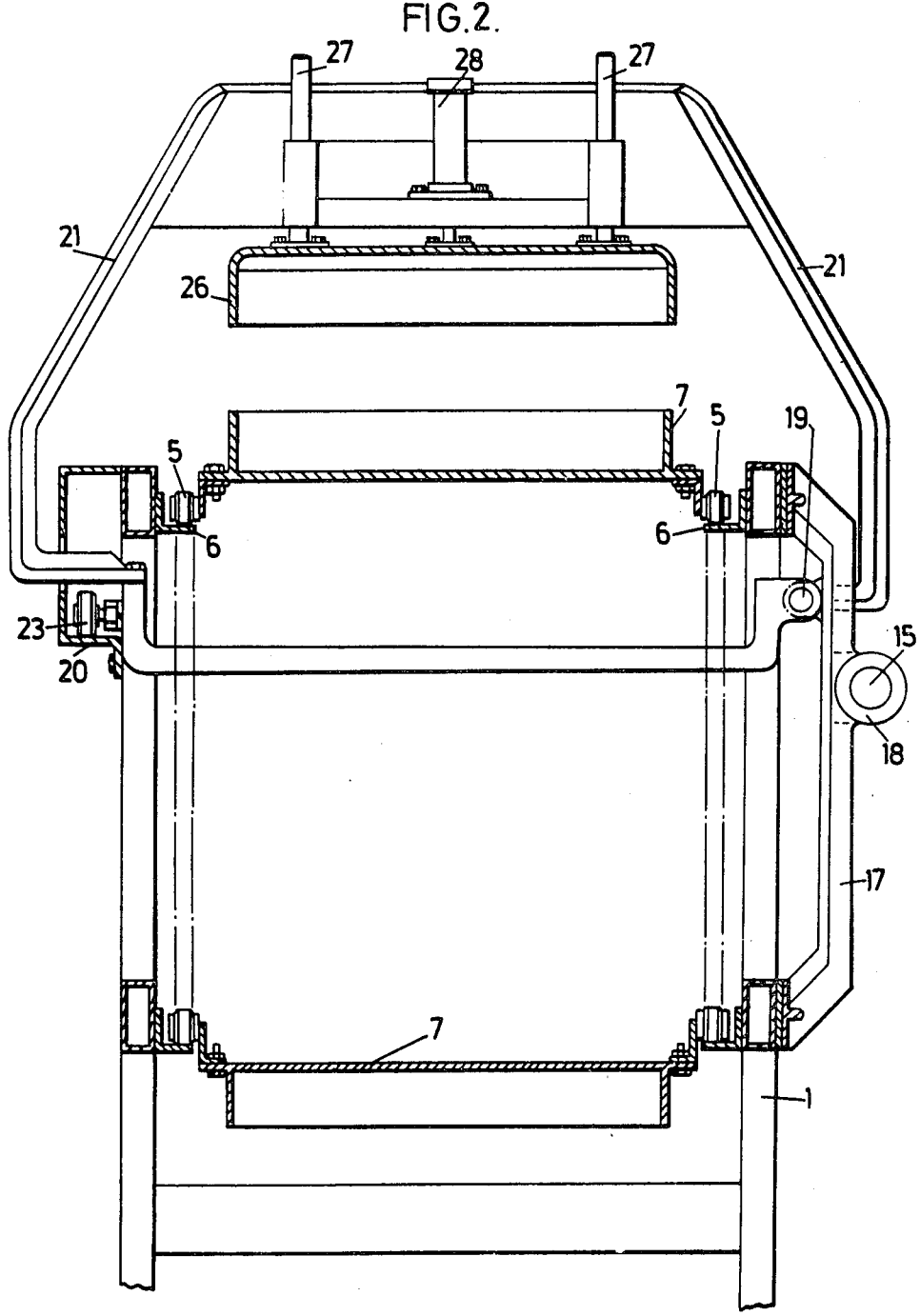
FIG. 2 is a section on the line II—II of FIG. 1.
Figure 3:
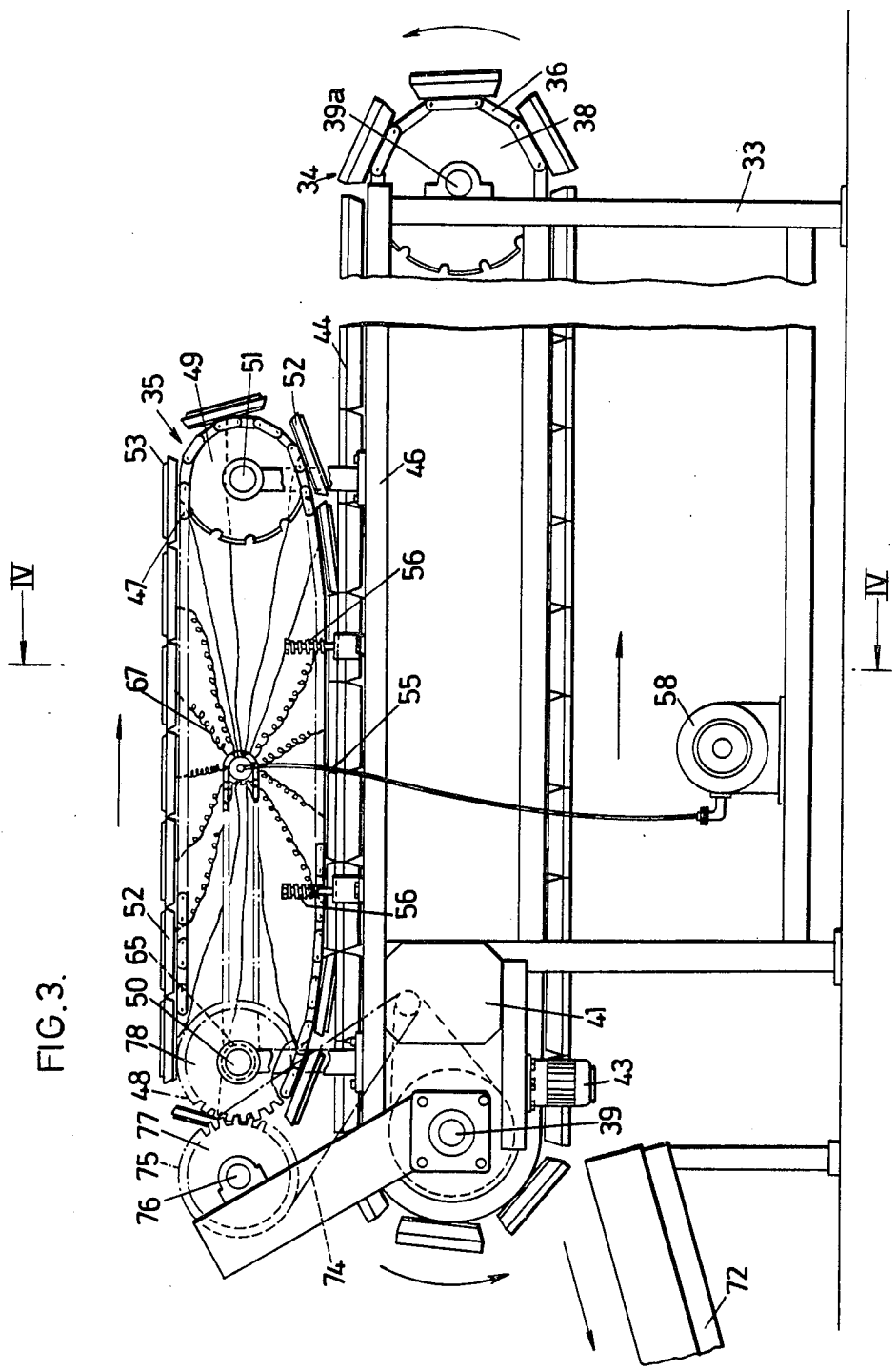
FIG. 3 is a side view of a further embodiment of the improved machine according to the present invention.
Figure 4:
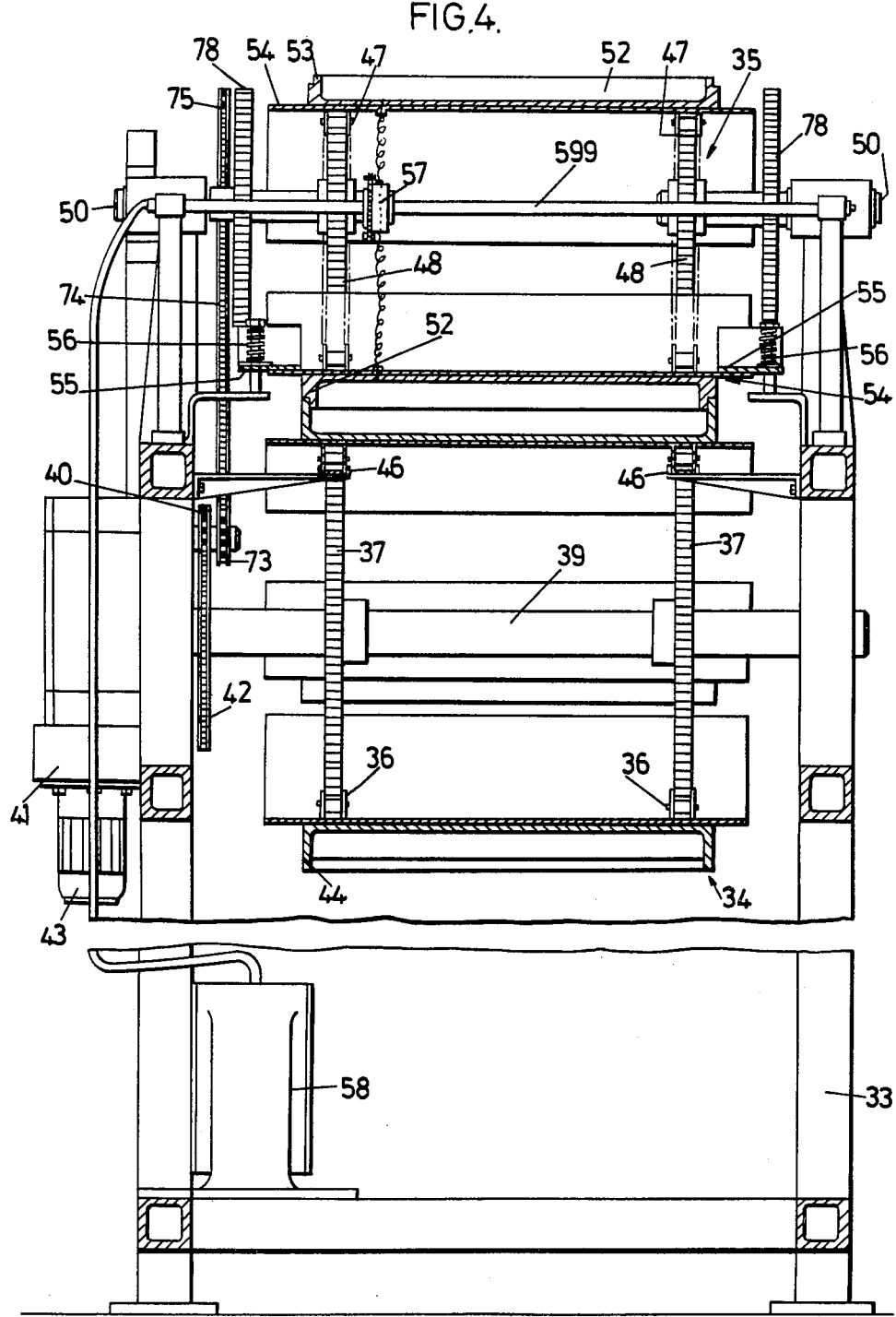
FIG. 4 is an enlarged section on the line IV—IV of FIG. 3.

FIGS. 1 and 2 show a base frame 1 which supports at its ends two pairs of coplanar gear wheels 3 and 4 of equal diameters, over which two chains 5 are mounted.

The chains 5 are supported between one and other gear of the same pair by straight guides 6, and support a plurality of identical transverse trays 7, each in the form of a truncated trapezoidal prism of elongated rectangular base.

When the trays 7 are on the straight portions of the chains 5, their major edges are adjacent to each other.

The base frame 1 also supports a geared reduction unit of conventional construction, contained in the box 8.

Said reduction unit is driven by an electric motor 9 by way of a chain drive 10, and comprises two power take-offs 11 and 12. By way of a chain drive 13, the power take-off 11 drives the pair of gears 3 which drive the chains 5.

The power take-off 12, through the coupling 14, rotates a shaft 15 comprising two identical and symmetrical helical grooves 16, which cross each other in the same portion of the shaft 15.

Said shaft 15 is supported by two suitable appendices 17 projecting from the frame 1, and can rotate in its bushes 18 while remaining axially blocked.

The appendices 17 also support a cylindrical guide 19. A mobile frame 21 slides on the guide 19 and on an opposing rail 20 located on the opposite side of the frame 1. Said frame 21 comprises two cylindrical bearings 22 mounted on the guide 19, and two wheels 23 slideable on the rail 20. A cylindrical sleeve 24 mounted on the shaft 15 branches from the frame 21 and is provided with an internal projection which is inserted into the grooves 16.

The rotational motion of the shaft 15 is thus transformed into a reciprocating straight motion of the frame 21, entrained by the internal projection of the sleeve 24. The passage from one to the other of the grooves 16 is favoured by the limit springs 25 present on the guide 19.

A hood 26 comprising two upper cylindrical appendices 27 inserted in two suitable guide seats present on the frame 21 can move vertically with respect to this latter, driven by the cylinder-piston unit 28 which connects the hood 26 to the frame 21. The dimensions of said hood 26 are such that it exactly covers three adjacent trays 7, and the stroke of the frame 21 is identical to the overall size of said three trays.

The two limiting positions of the hood 26 and relative support frame 21 are shown in FIG. 1 in continuous and dashed lines.

The hood 26 is open lowerly and comprises two lower cross members at the adjacent edges of the underlying trays 7.

Both the perimetral edge and said two cross members lowerly comprise suitable gaskets for providing a seal in co-operating with the underlying edges of the trays 7.

The hood 26 is connected by the pipe 29 to a tank under vacuum 30. A valve, not visible in the figure and not shown in that it is of conventional type, opens the pipe 29 only when the hood 26 has been lowered on to the trays 7. The operation of the machine is as follows: The trays 7 upstream of the hood 26 are fed with scalded tomatoes by the inclined shelf 31 or other suitable device connected to the scalding equipment. When the first three trays full of tomatoes arrive under the hood 26, this latter is lowered by the cylinder-piston unit 28 and simultaneously moves towards the left with the same forward movement as the trays 7 because of the engagement of the projection in the sleeve 24 in one of the two helical grooves 16 present on the shaft 15. During the forward movement or working stage of the hood 26, a vacuum is created by the vacuum pump 30 in the sealed chamber formed by superimposing the hood on a set of three trays, and this vacuum causes the tomato skins to break because of the expansion of the fruit. As the sleeve 24 reaches the end of said helical groove 16, the hood 26 is connected to atmosphere to break the vacuum, and is then raised again by the cylinder-piston unit 28, the internal projection of the sleeve 24 simultaneously engaging with the other groove 16 of the shaft 15 which returns the hood 26 to its initial position. The cycle is then repeated for the next three trays and so on as they arrive under the hood 26 at the beginning of its working stage. The trays subjected to vacuum during their continuous forward motion then reach the end of the machine and rotate about the pair of gear wheels 3 to discharge their contents on to a conventional machine for separating the tomato skins from the pulp, which in FIG. 1 of the accompanying drawings is indicated by the reference numeral 32. From the description heretofore it is evident that as the speed of translation of the hood 26 is equal to the speed of forward movement of the trays 7, both the forward stroke of the hood (or machine working stage) and the return stroke (or passive stage) are each equal to one half the distance between the centre lines of one group of three trays and the next.

FIGS. 3, 4, 5 and 6 show a further preferred embodiment of the improved machine, which permits a still greater working speed because of the absence of elements driven with reciprocating motion. This machine consists of a base frame 33 which supports a horizontal slat conveyor 34 and a further horizontal slat conveyor 35 located on the former over its upper terminal portion.

The horizontal conveyor 34 consists of a pair of endless parallel chains mounted about two pairs of gear wheels 37 and 38 keyed respectively on the horizontal parallel coplanar shafts 39 and 39a, disposed at the ends of said frame 33.

The shaft 39 is rotated by the sprocket wheel 40 of the reduction unit 41 by means of the chain 42.

The electric motor 43 is connected to said reduction unit 41. A plurality of identical adjacent trays 44 are fixed transversely on the pair of chains 36 of the conveyor 34.

These trays are preferably of truncated trapezoidal prism form with an elongated closed rectangular base.

A seal gasket 45 is embedded in the upper perimetral edge of each of said trays.

The upper horizontal portions of the chains 36 are supported by a pair of guides 46 to keep these portions perfectly horizontal.

The upper horizontal conveyor 35 is similar to the lower conveyor 34 and comprises two parallel chains of the same pitch and distance apart as the chains 36.

Said chains 47 are mounted endlessly about two pairs of gear wheels 48 and 49 rigid with two pairs of horizontal projecting shafts 50 and 51 idly mounted on suitable supports fixed to the machine frame 33. The shafts of each of said pairs 50 and 51 are coaxial.

Adjacent covers 52 are fixed transversely to the chains 47 and are each shaped so as to perfectly close each tray 44 of the lower conveyor 24. For this purpose each cover 52 is provided on its open side with a perimetral projection 53 arranged for insertion into each individual underlying tray 44 of the conveyor 34, in such a manner that this latter entrains the upper conveyor 35 with its movement.

This derives from the fact that the lower portion of the conveyor 35 and the upper portion of the conveyor 34 are mutually adjacent and parallel.

The covers 52 are also provided on their short sides with fins 54 which, during the passage of the trays along the lower horizontal portion of the conveyor 35, slide under two parallel guides 55, each located at the side of said conveyor.

These guides 55, fixed to the machine frame 33, are kept pressed downwards by a series of compression springs 56, so as to exert a pressing action on said fins 54 of the covers 52.

This, coupled with the presence of the gasket 45, ensures the seal between the covers 52 and trays 44.

The guides 55 are specially shaped at their ends and straight at their centre so as to ensure correct gradual insertion of the covers into the underlying trays.

The machine is also provided with means for generating a vacuum and subsequently restoring atmospheric pressure in the trays 44 during their movement along the portion corresponding to the upper conveyor 34. These means consist of a plug distributor 57 connected to a vacuum pump 58 fixed to the machine frame.

The distributor 57 is located in an intermediate position along the longitudinal extension of the upper conveyor 35.

Figure 5:
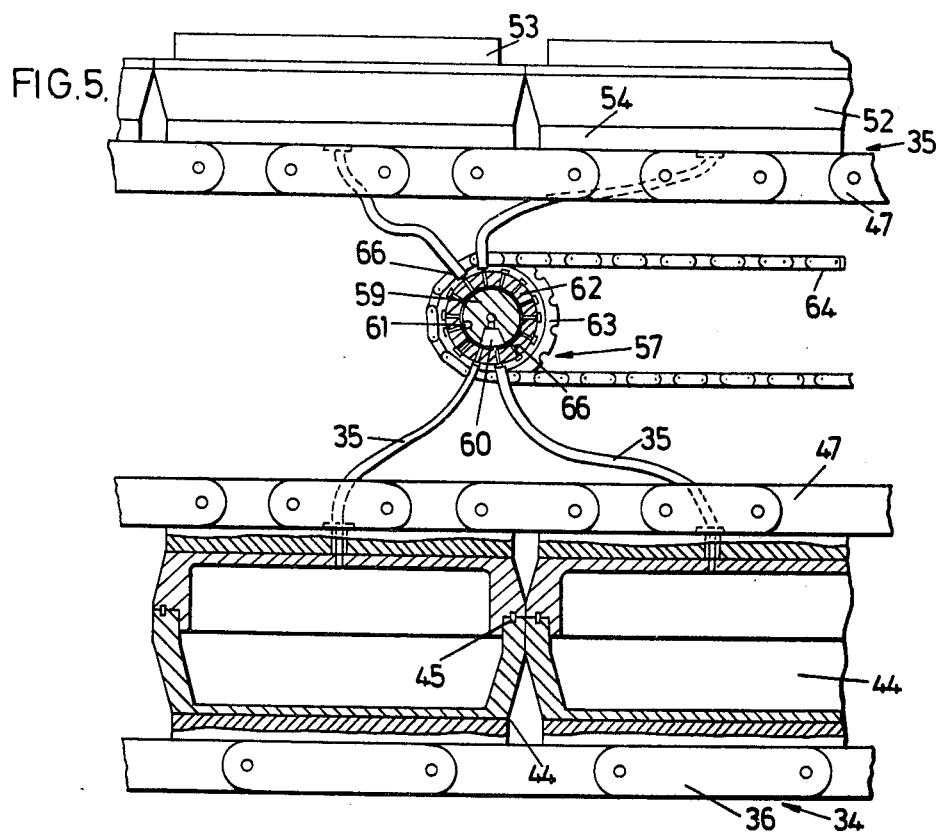
FIG. 5 is a side sectional view of an enlarged detail of said machine.
Figure 6:
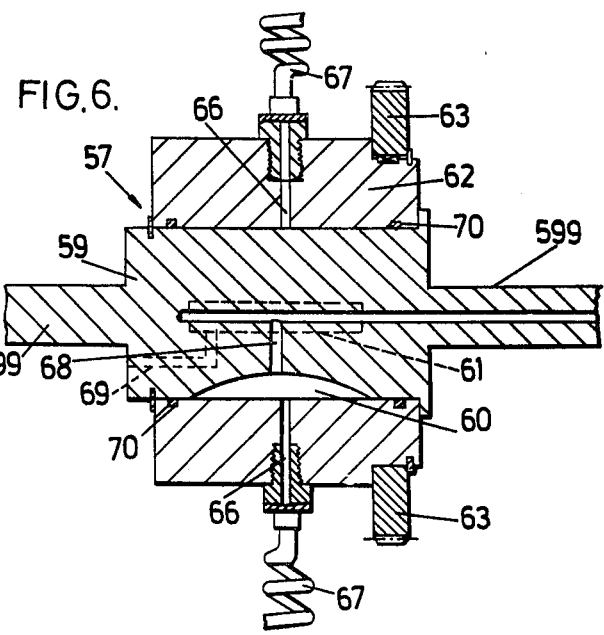
FIG. 6 is an enlarged axial section through the distributor for the vacuum applied to said machine.

This distributor, as shown in FIGS. 5 and 6, consists of a central cylindrical element or plug 59, rigid with a horizontal shaft 599 fixed to the machine frame 33.

This fixed plug 59 comprises on its peripheral surface two cavities 60 and 61 disposed at different angular positions, and is contained in an external cylindrical casing 62 on which is fixed a ring gear 63 rotated by a chain 64 from a gear wheel 65 keyed on to the shaft 50 of the conveyor 35.

The external cylinder 62 is provided with a series of radial through equidistant holes 66, each connected by a flexible pipe twisted as a helix 67 to the covers 52 of the conveyor 35.

The angular width of the cavity 60 of the central element 59 of the distributor 57 is such as to comprise a number of holes 66 of the external cylinder 62, whereas the angular width of the cavity 61 is such as to comprise only one hole.

The cavity 60 is connected by means of a duct 68 to the pipe connected to the vacuum pump 58.

The cavity 61 however is connected to atmosphere through a duct 69. The central element 59 of the distributor 57 is provided with two seal rings 70 located to the sides of the cavities 60 and 61 so as to ensure an airtight seal between said element 59 and the external cylinder 62. Finally, the reduction unit 41 is provided with a sprocket 73 connected by way of a chain 74 to a ring gear 75 keyed on a horizontal shaft 76 supported by the frame 33 to the front of the conveyor 35.

Said shaft also comprises a pair of gear wheels 77 which mesh with a pair of gear wheels 78 rigid with the shafts 50 of the conveyor 35. The high working speed obtainable by the machine as described is obvious, and when used in relation to the peeling process according to the invention is from three to eight times greater than the speed of known machines.

The operation of the machine is as follows: With the machine in motion, a certain number of tomatoes previously scalded in the known manner are placed in the trays of the conveyor 34, situated upstream of the upper portion which co-operates with the upper conveyor 35.

This loading may take place either manually or by a suitable elevator connected to a conventional tomato scalding machine.

During their passage under the conveyor 35, the trays 44 are each covered by a cover 52, the projection 53 of which is inserted into each tray.

This is facilitated by the presence of the elastic guides 55 which at the same time keep said covers pressed on to said trays 44. The gasket 55 ensures that the interior of the container formed by the tray 44 and cover 52 is perfectly airtight during its passage along said portion of the machine.

When a tray 44 loaded with tomatoes is hermetically closed by one of the covers 52 of the conveyor 35, the cavity 60 of the distributor 57 transmits the vacuum generated by the vacuum pump 58 along the flexible pipe to the corresponding cover and then to the tray 44.

This is because the external cylinder 62 of the distributor 57 rotates synchronously with the conveyors 34 and 35.

Thus for each revolution of the conveyor 35, the cylinder 62 of the distributor 57 makes one complete rotation about the central fixed element 59.

The vacuum remains inside the hermetic container formed by said elements 44 and 52 until the hole 66 in the cylinder 62 becomes connected to the cavity 61 of the distributor 57, which as stated is connected to atmosphere.

In this position, atmospheric pressure is restored in the container. During the stage in which the interior of the container is under vacuum, the skins of the contained tomatoes are broken and removed by the expansion of the fruit, due to this vacuum.

The time for which vacuum is maintained, of the order of 5 seconds, is set by suitably adjusting the speed of the conveyors.

From the description given heretofore it follows that as the trays 44 loaded with tomatoes pass under the conveyor 35, the covers 52 mounted on this latter hermetically close said trays and the necessary vacuum for breaking the tomato skins is set up inside them by way of the distributor 57.

Atmospheric pressure is subsequently restored by way of the same distributor, and at the end of the conveyor 34 the trays discharge the peeled tomatoes on to a conventional machine for separating the skins from the fruit.

Said separating machine has been illustrated diagrammatically in the figure as it is of known type, and is indicated by the reference numeral 72.

The invention is not limited to the embodiments heretofore described, and modifications and improvements may be made to it without leaving the scope of the invention, the essential characteristics of which are summarised in the following claims.

What is claimed is:

1. Improved machine for peeling tomatoes under vacuum, which machine comprises
   conveyor means for advancing a plurality of trays along a substantially horizontal path,
   at least one cover for said trays,
   cover-supporting means for advancing said covers above said trays parallel to said path, said cover-supporting means comprising a frame bridging said conveyor and mounted to reciprocate with respect to said path, and means for urging said cover into and out of sealing engagement with said trays,
   means for connecting said cover, while in sealing engagement with said trays, first to a vacuum chamber and then to a region under substantially atmospheric pressure, and
   means for causing said conveyor and said cover-supporting means to advance in synchronism which comprises a motor, a gear train through which said conveyor is driven by said motor, a threaded shaft rotatably driven by said motor, and follower means carried by said cover supporting means and engaging between the threads on said shaft, so that rotation of said shaft advances said cover-supporting means parallel to said path, said shaft being formed with both right and left-handed helical grooves, which are alternately engaged by said follower means to reciprocate said cover-supporting means.

2. Improved machine for peeling tomatoes under vacuum, which machine comprises
   conveyor means for advancing a plurality of trays along a substantially horizontal path,
   at least one cover for said trays,
   said cover being open at its bottom and provided with cross-members adapted to register with the adjacent edges of a plurality of trays, the peripheral edges and cross-members of said cover being provided with suitable gaskets for sealing engagement with the edges of said trays,
   cover-supporting means for advancing said covers above said trays parallel to said path, and for urging said cover into and out of sealing engagement with said trays,
   means for connecting said cover, while in sealing engagement with said trays, first to a vacuum chamber and then to a region under substantially atmospheric pressure, and
   means for causing said conveyor and said cover-supporting means to advance in synchronism.

3. Machine as claimed in claim 2 in which the trays are each shaped as a truncated trapezoidal prism having rectangular bases, the uppermost of which bases is open and larger than the other.

4. Machine as claimed in claim 2 in which the longer edges of said trays adjoin each other over straight stretches of said conveyor and extend transversely of said conveyor.

5. Machine as claimed in claim 2 in which said at least one cover is connected by a flexible pipe to the receiver of a vacuum pump.

6. Machine for peeling tomatoes under vacuum, said machine comprising:
- a horizontal conveyor belt,
- a motor driving said belt,
- a shaft driven by said motor and provided with right and left-handed helical grooves,
- a bridge frame extending transversely across said belt,
- a follower carried by said bridge frame and alternately engaging said grooves, whereby said bridge frame is driven alternately in opposite directions at the same speed as said conveyor, and parallel to said conveyor,
- trays carried by said conveyor,
- a cover carried by said bridge frame dimensioned to sealingly engage a group of said trays,
- fluid pressure means for moving said cover into and out of engagement with said trays,
- and means for alternately connecting said cover to atmospheric and sub-atmospheric pressure.

7. Machine as claimed in claim 6 in which each helical groove has a length equal to one half the distance between the center of one group of trays and the center of the next.

* * * * *